(12) United States Patent
Huang et al.

(10) Patent No.: US 11,061,469 B2
(45) Date of Patent: Jul. 13, 2021

(54) HEAD MOUNTED DISPLAY SYSTEM AND ROTATION CENTER CORRECTING METHOD THEREOF

(71) Applicant: XRSPACE CO., LTD., Taoyuan (TW)

(72) Inventors: Ching-Ning Huang, Taipei (TW);
Yi-Kang Hsieh, Hsinchu County (TW)

(73) Assignee: XRSPACE CO., LTD., Taoyuan (TW)

( * ) Notice: Subject to any disclaimer, the term of this patent is extended or adjusted under 35 U.S.C. 154(b) by 0 days.

(21) Appl. No.: 16/689,104

(22) Filed: Nov. 20, 2019

(65) Prior Publication Data

US 2021/0149479 A1 May 20, 2021

(51) Int. Cl.
*G06F 3/01* (2006.01)
*G06T 7/73* (2017.01)

(52) U.S. Cl.
CPC ............... *G06F 3/012* (2013.01); *G06T 7/73* (2017.01); *G06T 2207/30196* (2013.01); *G06T 2207/30244* (2013.01)

(58) Field of Classification Search
CPC . G06F 3/012; G06T 7/73; G06T 2207/30196; G06T 2207/30244
See application file for complete search history.

(56) References Cited

U.S. PATENT DOCUMENTS

| | | | | |
|---|---|---|---|---|
| 9,785,249 B1* | 10/2017 | Nie | .......................... | G06F 3/013 |
| 10,684,475 B2* | 6/2020 | Oto | ...................... | G02B 27/017 |
| 2009/0226035 A1* | 9/2009 | Iihoshi | ..................... | G06T 7/521 |
| | | | | 382/103 |
| 2013/0201291 A1* | 8/2013 | Liu | .......................... | G06T 7/74 |
| | | | | 348/47 |
| 2016/0282619 A1* | 9/2016 | Oto | .......................... | G06F 3/012 |
| 2016/0291688 A1* | 10/2016 | Hirota | ..................... | G09G 3/001 |
| 2016/0364904 A1* | 12/2016 | Parker | ..................... | G06F 3/038 |
| 2016/0371559 A1* | 12/2016 | Yang | .......................... | G06T 7/73 |

(Continued)

FOREIGN PATENT DOCUMENTS

| | | |
|---|---|---|
| CN | 104106262 | 10/2014 |
| CN | 106062826 | 10/2016 |

(Continued)

OTHER PUBLICATIONS

J. Lobo, et al., "Relative Pose Calibration Between Visual and Inertial Sensors," The International Journal of Robotics Research, vol. 26, No. 6, Jun. 1, 2007, pp. 561-575.

(Continued)

*Primary Examiner* — Amare Mengistu
*Assistant Examiner* — Jennifer L Zubajlo
(74) *Attorney, Agent, or Firm* — JCIP Global Inc.

(57) ABSTRACT

A head mounted display system and a rotation center correcting method thereof are provided. The head mounted display system is wearable on a user's head and includes a main body, a sensor, and a processor. The sensor is disposed at the main body and obtains sensing data corresponding to at least one pose of the user's head. The processor is coupled to the sensor and configured to generate pose data of the user's head based on the sensing data, and generate rotation center information of the user's head based on the pose data, wherein the rotation center information is related to a center corresponding to rotation of the user's head. Accordingly, the center of the rotation can be adjusted for different users.

18 Claims, 3 Drawing Sheets

(56) References Cited

U.S. PATENT DOCUMENTS

| | | | |
|---|---|---|---|
| 2017/0036111 A1* | 2/2017 | Shigeta | H04N 13/376 |
| 2017/0045736 A1* | 2/2017 | Fu | G02B 27/017 |
| 2017/0090556 A1* | 3/2017 | Baba | G09G 5/14 |
| 2017/0132453 A1* | 5/2017 | Sankaranarayanan | G06K 9/00268 |
| 2018/0054568 A1* | 2/2018 | Sugawara | G02B 27/0172 |
| 2019/0147237 A1* | 5/2019 | Yao | G06T 19/006 382/103 |
| 2019/0215637 A1* | 7/2019 | Lee | H04S 7/304 |
| 2019/0286229 A1* | 9/2019 | Chen | G06F 3/013 |

FOREIGN PATENT DOCUMENTS

| | | |
|---|---|---|
| CN | 108153417 | 6/2018 |
| CN | 109804220 | 5/2019 |
| JP | 2012223363 | 11/2012 |
| JP | 2018525693 | 9/2018 |
| TW | 201938104 | 10/2019 |
| TW | 201939973 | 10/2019 |
| WO | 2015098211 | 7/2015 |

OTHER PUBLICATIONS

"Search Report of Europe Counterpart Application", dated Jun. 10, 2020, p. 1-p. 8.

Office Action of Taiwan Counterpart Application, dated Jan. 8, 2021, pp. 1-13.

"Office Action of Japan Counterpart Application", dated Mar. 30, 2021, p. 1-p. 4.

* cited by examiner

HEAD MOUNTED DISPLAY SYSTEM AND ROTATION CENTER CORRECTING METHOD THEREOF

BACKGROUND OF THE DISCLOSURE

1. Field of the Disclosure

The present disclosure generally relates to a correction mechanism, in particular, to a head mounted display system and a rotation center correcting method thereof.

2. Description of Related Art

To provide intuitive operation on an electronic apparatus (such as a game player, a computer, a smartphone, a smart appliance, etc.), the motion of the user may be detected, to directly operate the electronic apparatus according to the motion of the user.

Some electronic apparatuses may allow human body portion (such as hands, legs, a head, etc.) of the user to control the operation of these electronic apparatuses, and the motion of the human body portion may be tracked. For example, a head mounted display (HMD) may be embedded with a sensor to track the motion of the user's head. It should be noted that the sensing result of the sensor is related to the rotation situation of the user's head, and the rotation of the head may affect the image content of the display in the HMD. For example, the head rotates toward the right, and the scene in the image content is moved from the center to the right.

In the conventional approaches, the HMD may be predefined with a center axis. It is assumed that the rotation of the display of the HMD corresponds to the center axis. However, the predefined center axis is not adapted for all users. If the predefined center axis is not consistent with the actual center axis of the user, the image content may have divergence with the cognition of the user what the user expects to see, and it may further result in motion sickness.

SUMMARY OF THE DISCLOSURE

Accordingly, the present disclosure is directed to a head mounted display system and a rotation center correcting method thereof, in which the center of the rotation could be updated.

In one of the exemplary embodiments, the head mounted display system is wearable on a user's head and includes, but not limited to, a main body, a sensor, and a processor. The sensor is disposed at the main body and used to obtain sensing data corresponding to the pose of the user's head. The processor is coupled to the sensor to the sensor. The processor is configured to generate pose data of the user's head based on the sensing data, and generate rotation center information of the user's head based on the pose data. The rotation center information is related to a center corresponding to rotation of the user's head.

In one of the exemplary embodiments, the rotation center correcting method is adapted for a head mounted display system wearable on a user's head. and the rotation center correcting method comprises the following steps. Pose data of the user's head is generated based on sensing data. The sensing data corresponds to at least one pose of the user's head. Rotation center information of the user's head is generated based on the pose data. The rotation center information is related to a center corresponding to rotation of the user's head.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
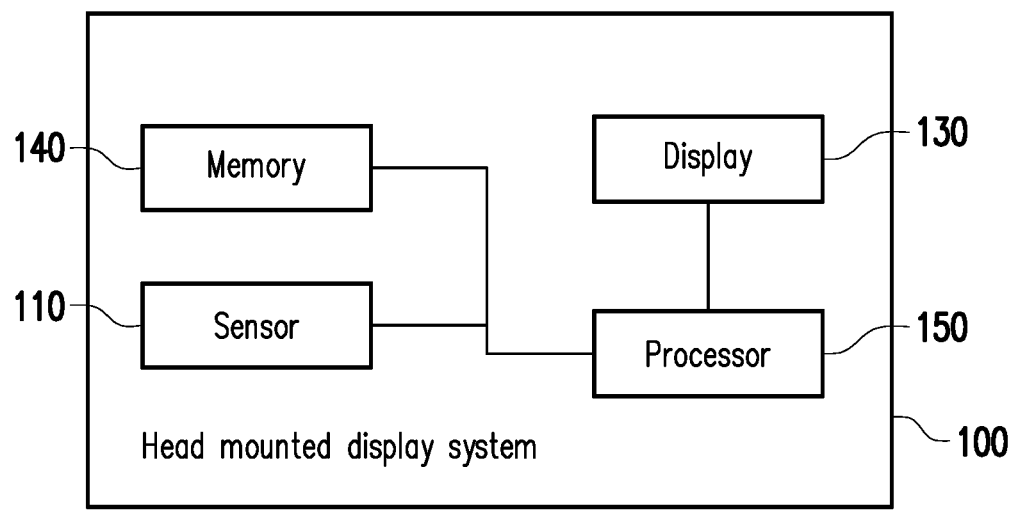
FIG. 1 is a block diagram illustrating a head mounted display system according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram illustrating a head mounted display system according to one of the exemplary embodiments of the disclosure. Referring to FIG. 1, the head mounted display system 100 includes, but not limited to, a sensor 110, a display 130, a memory 140, and a processor 150. The head mounted display system 100 is adapted for VR, AR, MR, XR or other reality-related technology.

The sensor 110 is disposed at the main body of the head mounted display system 100. After the user wears the head mounted display system 100, the sensor 110 may be located in front of the user's eyes or brow. The sensor 110 is used for obtaining sensing data corresponding to one or more poses of the user's head.

In one embodiment, the sensor 110 may be a camera, such as a monochrome camera or a color camera, a deep camera, a video recorder, or other image sensors capable of capturing images. In some embodiments, the sensor 110 may be used to capture the sense in front of a user, to generate camera images.

In another embodiment, the sensor 110 may be an accelerometer, a gyroscope, a magnetometer, a laser sensor, an inertial measurement unit (IMU), an infrared ray (IR) sensor, or any combination of aforementioned motion sensors. The sensor 110 is used for sensing the motion itself, and acted with the main body of the head mounted display system 100 in which itself is placed. After the user wears the head mounted display system 100, the sensor 110 may track the motion of the user's head, so as to generate a sequence of sensing data from the sensing result of the sensor 110 (e.g. sensed strength values, etc.) at multiple time points within the time period. For one example, the sensing data comprises a 3-degree of freedom (3-DoF) data, and the 3-DoF data is related to the rotation data of the human body portion in three-dimensional (3D) space, such as accelerations in yaw, roll, and pitch. For another example, the sensing data includes a relative position and/or displacement of a human body portion in the 2D/3D space.

In still another embodiment, the sensor 110 may include both of the aforementioned image sensor and motion sensor.

The display 130 is disposed at the main body of the head mounted display system 100. The display 130 may be a liquid-crystal display (LCD), a light-emitting diode (LED) display, an organic light-emitting diode (OLED) display, or other displays. In the embodiment of the disclosure, the display 130 is used for displaying images.

The memory 140 may be any type of a fixed or movable Random-Access Memory (RAM), a Read-Only Memory (ROM), a flash memory, a similar device or a combination of the above devices. The memory 140 records program codes, device configurations, buffer data or permanent data (such as images, sensing result, sensing data, pose data, rotation center information, etc.), and these data would be introduced later.

The processor 150 is coupled to the sensor 110, the display 130, and the memory 140. The processor 150 is configured to load the program codes stored in the memory 140, to perform a procedure of the exemplary embodiment of the disclosure.

In some embodiments, functions of the processor 150 may be implemented by using a programmable unit such as a central processing unit (CPU), a microprocessor, a microcontroller, a digital signal processing (DSP) chip, a field programmable gate array (FPGA), etc. In one embodiment, the functions of the processor 150 may also be implemented by an independent electronic device or an integrated circuit (IC), and operations of the processor 150 may also be implemented by software.

To better understand the operating process provided in one or more embodiments of the disclosure, several embodiments will be exemplified below to elaborate the operating process of the head mounted display system 100. The devices and modules in the head mounted display system 100 are applied in the following embodiments to explain the scene scanning method provided herein. Each step of the method can be adjusted according to actual implementation situations and should not be limited to what is described herein.

Figure 2:
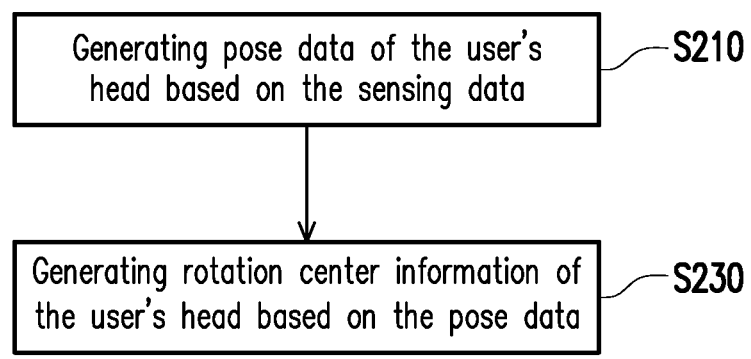
FIG. 2 is a flowchart illustrating a rotation center correcting method according to one of the exemplary embodiments of the disclosure.

FIG. 2 is a flowchart illustrating a rotation center correcting method according to one of the exemplary embodiments of the disclosure. Referring to FIG. 2, the processor 150 generates pose data of the user's head based on sensing data (step S210). Regarding different types of the sensor 110, camera images, acceleration, rotation, magnetic force, orientation, distance and/or position (called sensing result thereafter) for the motion of the user's head in a 2D/3D space may be obtained, and one or more sensing results of the sensor 110 would become the sensing data of the human body portion.

In one embodiment, the sensor 110 is an image sensor and obtains one or more camera images. The processor 150 can obtain the sensing data from the camera images. For example, the sensing strength and the pixel position corresponding to one or more real objects (such as wall, table, floor, etc.) can be used for estimating depth information of the target real object (i.e., a distance relative to the sensor 110 or any point on the main body of the head mounted display system 100), so as to estimate the position and the orientation of the sensor 110 in the space where the user is located. The position data and the rotation data (corresponding to the orientation) of the sensor 110 correspond to the pose of the user's head.

In another embodiment, the sensor 110 is an IMU, and the processor 150 obtains the sensing data from the IMU. For example, the sensing result such as the acceleration, rotation (which may include orientation and angular velocity), and/or magnetic field of the sensor 110 could be the rotation data of the pose data. The displacement of the user's head can be estimated through double integral on the detected acceleration of the sensor 110 in three axes, so as to estimate the position data of the pose data.

In still another embodiment, the sensor 110 may include both an image sensor and an IMU. The processor 150 may determine the sensing data according to the camera images from the image sensor and the sensing result from the IMU. For example, the processor 150 may use the rotation data based on the IMU to correct the rotation data and/or the position data based on the image sensor. For another example, the pose data may be related to a weighted combination of the rotation data and the position data based on the IMU and the image sensor.

After the sensing data is determined, the processor 150 may generate the pose data based on the aforementioned position data, and/or rotation data. It should be noted that the pose data may correspond to one or more poses of the user's head.

Figure 3:
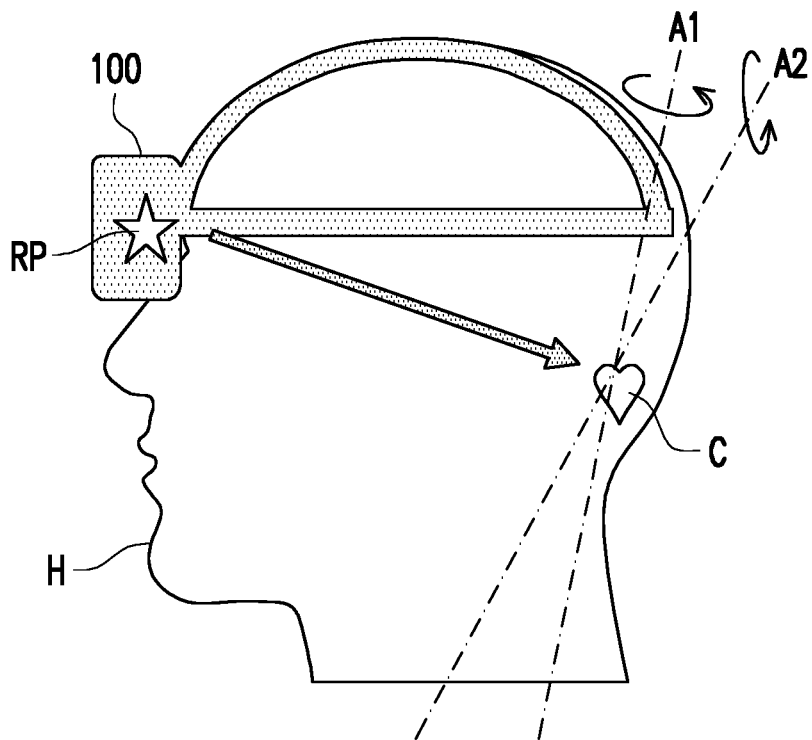
FIG. 3 is a schematic diagram illustrating the rotation of the head according to one of the exemplary embodiments of the disclosure.

The processor 150 may generate rotation center information of the user's head based on the pose data (step S230). Specifically, the rotation center information is related to the center corresponding to the rotation of the user's head. The rotation center information may be different for different users. FIG. 3 is a schematic diagram illustrating the rotation of the head according to one of the exemplary embodiments of the disclosure. Referring to FIG. 3, it is assumed that the yaw of the user's head H corresponds to axis A1, and the pitch of the head H corresponds to axis A2. The intersection point of the axes A1 and A2 could be considered as the center C of the rotation of the head H. If the reference point RP corresponds to the position of the sensor 110 or another point on the main body of the head mounted display system 100, the distance between the center C and the reference point RP may be the same in response to most or all of the poses of the heads. In one embodiment, the processor 150 may determine the center C based on the actual rotation situation of the head H.

In one embodiment, in step S210, the processor 150 may generate the pose data corresponding to multiple reference points in the space. The reference points correspond to multiple positions of the sensor 110 at different poses of the user's head. The processor 150 may provide a guide instruction through the display 130, a speaker, or LEDs, and the guide instruction may be related to how to move the user's head or move to some specific poses. The processor 150 may generate the pose data corresponding to the currently pose of the head in response to a trigger condition. The trigger condition may be such as some specific rotation degrees, time period, or user's input data such as voice command or gesture.

Figure 4A:
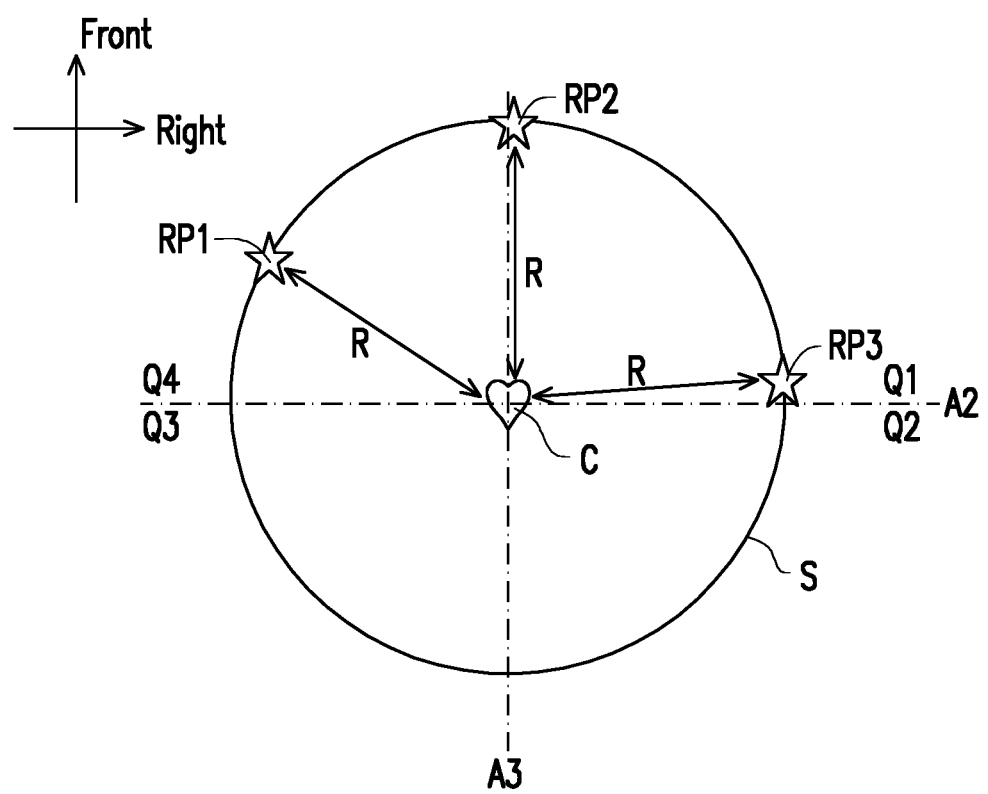
FIG. 4A is a schematic diagram illustrating the determination of the reference points according to one of the exemplary embodiments of the disclosure.

In one embodiment, the processor 150 may obtain the sensing data corresponding to three or more reference points, and these reference points are located at two quadrants in a horizontal plane of the space. For example, FIG. 4A is a schematic diagram illustrating the determination of the reference points according to one of the exemplary embodiments of the disclosure. Referring to FIG. 4A, the top of the figure corresponds to the front of the user's head, and the right of the figure corresponds to the right of the head. In the horizontal plane, there are four quadrants in the coordinate system formed by the axes A1 and A2. In this example, three reference points RP1, RP2 and RP3 are obtained, in which the reference points RP1 and RP2 are located at two quadrants Q4 and Q1, respectively.

Figure 4B:
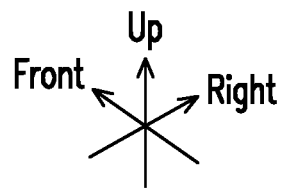
FIG. 4B is a schematic diagram illustrating the determination of the reference points according to one of the exemplary embodiments of the disclosure.
Figure 4B:
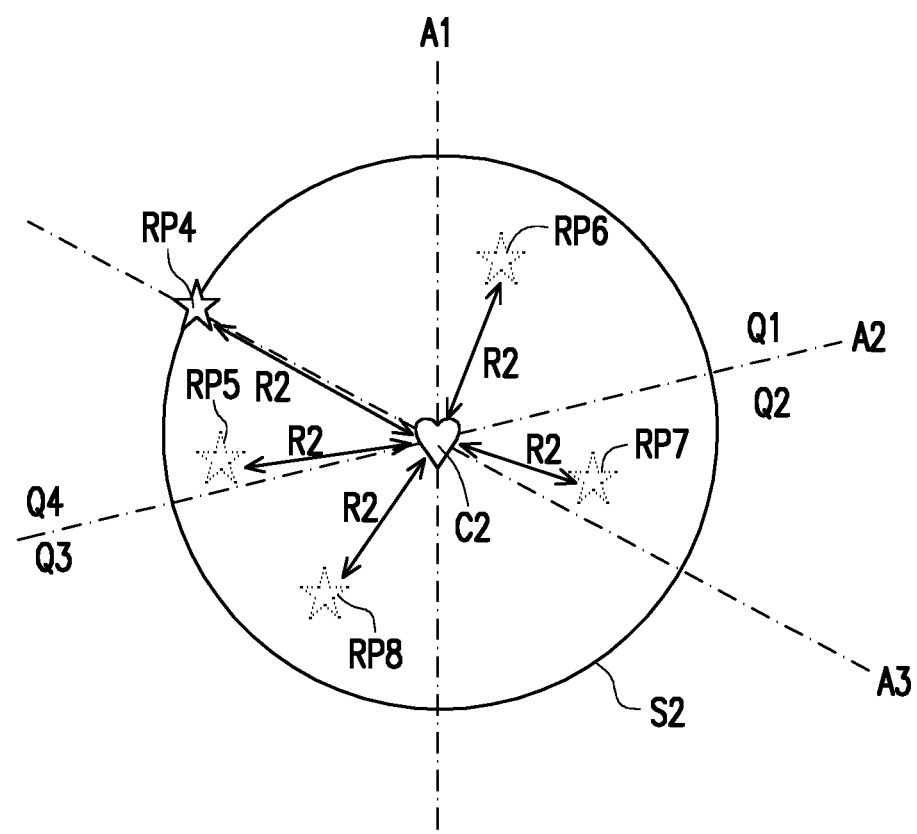

In one embodiment, the processor 150 may obtain the sensing data corresponding to five or more reference points, and these reference points are located at four quadrants in the space. For example, FIG. 4B is a schematic diagram illustrating the determination of the reference points according to one of the exemplary embodiments of the disclosure. Referring to FIG. 4B, the upper left of the figure corresponds to the front of the user's head, the upper right of the figure corresponds to the right of the head, and the top of the figure corresponds to the top of the head. In the 3-dimension space, there are four quadrants in the front half of the coordinate system formed by the axes A1, A2, and A3. In this example, three reference points RP4~RP8 are obtained, in which the reference points RP6, RP7, RP8, and RP5 are located at four quadrants Q1, Q2, Q3, and Q4, respectively.

The processor 150 may collect the sensing data of the determined reference points, and generate the pose data corresponding to these reference points accordingly.

In one embodiment, the processor 150 may determine a spheroid in which the determined reference points are located at the surface of the spheroid. Specifically, the processor 150 assumes the trajectory, which the sensor 110 or a specific point at the main body of the head mounted display system 100 travels, is located at the surface of the spheroid, so that the reference points corresponding to the sensor 110 or the specific point at the main body of the head mounted display system 100 are also located at the surface of the spheroid. Taking FIG. 4A as an example, it is assumed the spheroid S is a sphere. The reference points RP1~RP3 are located at the surface of spheroid S. The processor 150 may use a fitting algorithm (e.g., curve fitting, spline curve, etc.) to determine the shape of the spheroid, so that all determined reference points can be located at the surface of the determined spheroid.

Taking FIG. 4A as an example, regarding the circle fitting algorithm, the processor 150 may determine the x and y-coordinates of the reference points RP1~RP3 in the coordinate plane formed by the axes A1 and A2, and the x and y-coordinates may be fed into the circle function. Then, the processor 150 calculates the least-squares solution of the circle function, to obtain the x and y-coordinates of the center C and the distance R, so as to determine the surface of spheroid S.

It should be noted that the aforementioned number of the reference points is determined based on the fitting algorithm and may be modified based on the actual requirements.

In one embodiment, the processor 150 may generate the rotation center information based on the center of the spheroid. Taking FIG. 4A as an example, the spheroid S is a sphere. The distance R between the center C of the spheroid S and any one of the reference points RP1~RP3 would be the same and equals to the radius of the spheroid S. The intersection of the circles form based on the reference points RP1~RP3 as the centers of the circles, respectively, would be the center C.

Taking FIG. 4B as another example, the spheroid S2 is also a sphere. The distance R2 between the center C2 of the spheroid S2 and any one of the reference points RP4~RP8 would be the same and equals to the radius of the spheroid S2. Then, the processor 150 may generate the rotation center information based on the position data of the center C/C2 of the spheroid S/S2.

Accordingly, the rotation center information can be updated. The rotation center correcting method can be triggered on the head mounted display system 100 in response to the user input, booting up, or other situations. Every time the user wears the head mounted display system 100, the rotation center information would be adapted for the currently used user after the update of the rotation center information.

It should be noted that in some embodiments, the spheroid may be the flattened spheroid, prolated spheroid, or other spheroid.

In addition, the aforementioned updating procedure for the rotation center information may be performed in multiple situations. In one embodiment, the processor 150 may update the rotation center information at factory test, factory calibration, factory configuration, or other stages before the head mounted display system 100 is shipped. In another embodiment, the processor 150 may update the rotation center information in run-time. The run time or execution time is the time during which a program of the rotation center correcting method of the embodiment is running (executing) by the processor 150. For example, after the head mounted display system 100 is shipped, a user still can modify the rotation center information of the head mounted display system 100. Therefore, one head mounted display system 100 may be adapted for multiple users in which different user may have different rotation situations for their heads. In some embodiments, during boot procedure or some specific program of the head mounted display system 100, the rotation center information may be updated, too.

In one embodiment, the processor 150 may display an image based on the rotation center information through the display 130 in response to the rotation of the user's head. For example, the processor 150 may generate a first coordinate system for the sensor or a specific point at the main body of the head mounted display system 100 and a second coordinate system based on the rotation center information. Then, the processor 150 may map the first coordinate system into the second coordinate system, and the position data and the rotation data of the sensor 110 can be transformed into the position data and the rotation data in the second coordinate system. Eventually, the processor 150 may transform the second coordinate system into a field-of-view (FoV) coordinate system corresponding to the view of the user. Then, the processor 150 may generate the image, which would be displayed on the display 130, based on the FoV coordinate system. On the basis of the transformation relations between these coordinate system, the actual view of the user can correspond to the image displayed on the display 130, so as to reduce or prevent motion sickness.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A head mounted display system, wearable on a user's head, and comprising:
 a main body;

a sensor, disposed at the main body, and obtaining sensing data corresponding to at least one pose of the user's head; and a processor, coupled to the sensor, and configured for:

generating pose data of the user's head based on the sensing data, wherein the pose data corresponds a plurality of positions of the sensor at different poses of the user's head; and generating rotation center information of the user's head based on the pose data, wherein the rotation center information comprises a center corresponding to rotation of the user's head, and generating the rotation center information further comprising:

using the plurality of positions of the sensor at different poses of the user's head to fit a surface of a spheroid, to determine a representative of the spheroid in which the plurality of positions of the sensor are located at the surface of the spheroid, wherein the center of the spheroid is determined according to the representative of the spheroid; and determining the center corresponding to rotation of the user's head is the center of the spheroid.

2. The head mounted display system according to claim 1, wherein the rotation center information is updated in run-time.

3. The head mounted display system according to claim 1, wherein the processor is configured for:

generating the pose data corresponding to a plurality of reference points in a space, wherein the plurality of reference points correspond to the plurality of positions of the sensor at different poses of the user's head.

4. The head mounted display system according to claim 3, wherein the processor is configured for:

obtaining the sensing data corresponding to at least three of the reference points, wherein the at least three of the reference points are located at two quadrants in a horizontal plane of the space.

5. The head mounted display system according to claim 3, wherein the processor is configured for:

obtaining the sensing data corresponding to at least five of the reference points, wherein the at least five of the reference points are located at four quadrants in the space.

6. The head mounted display system according to claim 1, wherein the sensor obtains a plurality of camera images, and the processor is configured for:

determining the sensing data from the camera images.

7. The head mounted display system according to claim 1, wherein the sensor is an inertial measurement unit (IMU), and the processor is configured for:

obtaining the sensing data from the IMU.

8. The head mounted display system according to claim 1, wherein the sensor obtains a plurality of camera images, and the head mounted display system further comprises:

a second sensor, wherein the second sensor is an IMU, and the processor is configured for:

determining the sensing data according to the camera images and a sensing result from the IMU.

9. The head mounted display system according to claim 1, further comprising:

a display, wherein the processor is configured for:

displaying an image based on the rotation center information through the display in response to the rotation of the user's head.

10. A rotation center correcting method, adapted for a head mounted display system wearable on a user's head, and the rotation center correcting method comprising:

generating pose data of the user's head based on sensing data, wherein the sensing data corresponds to at least one pose of the user's head, wherein the pose data corresponds a plurality of positions of a sensor acted with the user's head at different poses of the user's head; and generating rotation center information of the user's head based on the pose data, wherein the rotation center information comprises a center corresponding to rotation of the user's head, and generating the rotation center information further comprising:

using the plurality of positions of the sensor at different poses of the user's head to fit a surface of a spheroid, to determine a representative of the spheroid in which the plurality of positions of the sensor are located at the surface of the spheroid, wherein the center of the spheroid is determined according to the representative of the spheroid; and determining the center corresponding to rotation of the user's head is the center of the spheroid.

11. The rotation center correcting method according to claim 10, further comprising:

updating the rotation center information in run-time.

12. The rotation center correcting method according to claim 10, wherein the step of generating the pose data of the user's head based on the sensing data comprises:

generating the pose data corresponding to a plurality of reference points in a space, wherein the plurality of reference points correspond to the plurality of positions of the sensor at different poses of the user's head.

13. The rotation center correcting method according to claim 12, wherein the step of generating the pose data corresponding to the plurality of reference points in the space comprises:

obtaining the sensing data corresponding to at least three of the reference points, wherein the at least three of the reference points are located at two quadrants in a horizontal plane of the space.

14. The rotation center correcting method according to claim 12, wherein the step of generating the pose data corresponding to the plurality of reference points in the space comprises:

obtaining the sensing data corresponding to at least five of the reference points, wherein the at least five of the reference points are located at four quadrants in the space.

15. The rotation center correcting method according to claim 10, wherein the step of generating the pose data comprises:

obtaining a plurality of camera images; and determining the sensing data from the camera images.

16. The rotation center correcting method according to claim 10, wherein the step of generating the pose data comprises:

obtaining the sensing data from an inertial measurement unit (IMU).

17. The rotation center correcting method according to claim 10, wherein the step of generating the pose data comprises:

obtaining a plurality of camera images; and determining the sensing data according to the camera images and a sensing result from an IMU.

18. The rotation center correcting method according to claim 10, further comprising:

displaying an image based on the rotation center information in response to the rotation of the user's head.

\* \* \* \* \*